United States Patent [19]

Takanashi et al.

[11] Patent Number: 4,956,713
[45] Date of Patent: Sep. 11, 1990

[54] IMAGE PICK-UP APPARATUS USING PHOTO-TO-PHOTO CONVERSION ELEMENT

[75] Inventors: Itsuo Takanashi, Kamakura; Shintaro Nakagaki, Fujisawa; Tsutou Asakura, Yokohama; Masato Furuya, Yokosuka; Hirohiko Shinonaga, Yokohama; Hiromichi Tai, Yokosuka, all of Japan

[73] Assignee: Victor Company of Japan, Ltd., Yokohama, Japan

[21] Appl. No.: 350,798

[22] Filed: May 12, 1989

[30] Foreign Application Priority Data

May 13, 1988 [JP] Japan .................. 63-116157
May 19, 1988 [JP] Japan .................. 63-122281

[51] Int. Cl.$^5$ ............................................. H04N 5/30
[52] U.S. Cl. .................................. 358/209; 358/217
[58] Field of Search ................... 358/213.14, 209, 217

[56] References Cited

U.S. PATENT DOCUMENTS

| | | | |
|---|---|---|---|
| 2,929,866 | 3/1960 | Melamed | 358/209 |
| 3,253,497 | 5/1966 | Dreyer | 358/209 |
| 3,283,159 | 11/1966 | Robbins | 358/209 |
| 3,509,276 | 4/1970 | Gabor | 358/209 |
| 3,624,287 | 11/1971 | Scanlon | 358/213.14 |
| 3,716,747 | 2/1973 | Patel | 358/213.14 |
| 3,865,975 | 2/1975 | Fletcher et al. | 358/213.14 |
| 4,597,017 | 6/1986 | Johnson et al. | 358/217 |
| 4,727,427 | 2/1988 | Kime | 358/217 |
| 4,831,452 | 5/1989 | Takanashi et al. | 358/213.14 |

Primary Examiner—Stephen Brinich
Attorney, Agent, or Firm—Fleit, Jacobson, Cohn, Price, Holman & Stern

[57] ABSTRACT

An image pickup apparatus comprising a circuit for forming an electric charge image corresponding to an optical image of an object to be image-picked up in a photo-photo conversion element constructed of two transparent electrodes with at least a photoconductive layer and a photo-modulation layer being interposed therebetween, by applying a light from the object to the photoconductive layer, a circuit for reading the electric charge image corresponding to the optical image of the object as optical information, by applying a reading light to the photo-modulation layer, means for erasing the electric charge image corresponding to the optical image of the object, wherein an erase operation and read operation are intermittently repeated for the electric charge image, and the reading means operating in a limited period which is substantially short compared to a period in which the forming means operate.

In a similar image pickup apparatus the reading means operate only in a period in which the light incident to the photo-photo conversion element is intercepted by the optical shutter.

A further apparatus comprising a circuit for transferring the electrical charge image formed in the first photo-photo conversion element to a second photo-photo conversion element during a period substantially shorter than the writing period by reading and writing the electrical charge image, optically at a time, from the first to second photo-photo conversion elements respectively, and a circuit for reading optical image information of an optical image supplied to the second photo-photo conversion element by applying a reading light to the reading light input side of the second photo-photo conversion element.

8 Claims, 8 Drawing Sheets

IMAGE PICK-UP APPARATUS USING PHOTO-TO-PHOTO CONVERSION ELEMENT

BACKGROUND OF THE INVENTION

1. Field of the Invention

The present invention relates to an image pickup apparatus particularly with high resolution capability.

2. Description of Related Background Art

A video signal obtained by picking up an optical image of an object with an image pickup apparatus can be easily processed such as editing, trimming and the like. Recording/reproducing a video signal can also be easily performed by using an alterable memory. With a conventional image pickup apparatus, an optical image of an object is focussed onto a photo-conversion region of an image pickup element by a taking lens to be converted into electric image information. The electric image information is time sequentially outputted as a video signal. Various image tubes or solid state image pickup elements have been used for such conventional image pickup apparatus.

It is also known that various new television systems such as EDTV, HDTV and the like have been proposed for recent requirements of high quality and resolution of reproduced images.

In order to reproduce images with high quality and resolution, it is necessary for an image pickup apparatus to generate a video signal by which an image of high quality and resolution can be reproduced. However, an image pickup apparatus using an image tube has a limit in reducing the diameter of an electron beam, and also the target capacity thereof increases as its size becomes large, resulting in a poor resolution. Further, for high resolution moving images, the frequency band of a video signal becomes larger than several tens to hundreds MHz, thus posing a problem of poor S/N. The above problems have made it difficult to obtain reproduced images of high quality and resolution.

More specifically, in order to obtain a video signal by which an image of high quality and resolution can be reproduced, it is necessary to reduce the diameter of an electron beam or use a target of large area. However, there is a limit in reducing the diameter of an electron beam because of the performance of electron gun and the structure of focussing system. If the area of a target is made large using a large taking lens, the target capacitance becomes large so that the high frequency component of a video signal is degraded and hence the S/N thereof becomes considerably bad. Thus, it is impossible for an image pickup apparatus with an image tube to obtain a video signal for a reproduced image of high quality and resolution.

In the case of an image pickup apparatus with a solid state image pickup element, in order to obtain a video signal by which an image of high quality and resolution can be reproduced, it is necessary to use a solid state image pickup element having a large number of picture elements. However, with the solid image element having a large number of picture elements, the drive clock frequency becomes high (in the case of moving images, it is about several hundreds MHz) and the capacitance of the drive circuit becomes large as the number of picture elements increases. The clock frequency presently used for a solid state image pickup element is generally about 20 MHz so that such an image pickup apparatus cannot be used in practice.

As above, conventional image pickup apparatus cannot generate a video signal suitable for high resolution and quality of reproduced images.

The applicant company of this invention has proposed an image pickup apparatus capable of solving the above problems. According to such an image pickup apparatus, an optical image of an object to be image picked up is focussed with a taking lens onto to a photo-photo conversion element constructed of two transparent electrodes with at least a photo-conductive layer, dielectric mirror and photo-modulation layer interposed therebetween, and optical image information of the object is optically read from the photo-photo conversion element and photoelectrically converted into video signals with high resolution. FIG. 2 is a side elevational cross section illustrating the exemplary structure of a photo-photo conversion element PPC. In FIG. 2, reference numerals 1 and 2 represent glass plates, 3 and 4 transparent electrodes, 5 and 6 terminals, 7 a photoconductive layer, 8 a dielectric mirror, 9 an optical member (e.g., a photo-modulation layer such as lithium niobate, or nematic liquid crystal layer) which changes the light characteristics with the intensity distribution of an electric field applied thereto, WL a writing light, RL a reading light, and EL an erasing light.

In FIG. 2, the incident direction of the erasing light EL is shown same as that of the reading light RL. Such an incident direction of the erasing light EL is used for the case where the dielectric mirror 8 of the photo-photo conversion element PPC has the light transmittance characteristics that the reading light RL is reflected and the erasing light EL is transmitted.

In writing optical information in the photo-photo conversion element PPC shown in FIG. 2, a circuit made of a power source 10 and a switch SW is connected between the terminals 5 and 6 of the photo-photo conversion element PPC. The movable contact of the switch SW is turned to a fixed contact WR upon reception of a switch control signal supplied to an input terminal 11 of the switch SW. Then, a voltage from the power source 10 is applied between the transparent electrodes 3 and 4 to provide an electric field between opposite sides of the photoconductive layer 7. In this condition, a writing light WL is applied from the glass plate 1 of the photo-photo conversion element PPC to write optical information therein.

Specifically, when the writing light WL incident to the photo-photo conversion element PPC transmits the glass plate 1 and transparent electrode 3 and reaches the photoconductive layer 7, the resistance value of the photoconductive layer 7 changes in accordance with the optical image of the incident light. Therefore, an electric charge image corresponding to the optical image of the incident light is produced at an interface between the photoconductive layer 7 and dielectric mirror 8.

In reproducing from the photo-photo conversion element the optical information written in the form of electric charge image corresponding to the optical image of the incident light, a reading light RL of certain light intensity projected from a light source (not shown) is applied from the glass plate 2 to the photo-photo conversion element PPC while maintaining the movable contact of the switch SW at the fixed contact WR and applying a voltage of the power source 10 via the terminals 5 and 6 between the transparent electrodes 3 and 4.

Specifically, an electric charge image corresponding to the optical image of an incident light is being produced at the interface between the photoconductive layer 7 and dielectric mirror 8. Therefore, an electric field having an intensity distribution corresponding to the optical image of the incident light is being applied to the optical member 9 (e.g., lithium niobate monocrystal) which is in series with the photoconductive layer 7 and dielectric mirror 8.

The refractive index of the lithium niobate monocrystal 9 changes with an electric field applied thereto, because of the electrooptical effect. Therefore, the refractive index of the lithium niobate monocrystal 9 changes with the electric charge image which has changed the electric field to have an intensity distribution corresponding to the electric charge image.

The reading light RL projected toward the glass plate 2 poropagates along the optical path of transparent electrode 4, lithium niobate monocrystal 9, and dielectric mirror 8. The reading light RL is then reflected by the dielectric mirror 8 and returns toward the glass plate 2. In this case, the reading light RL having passed through the lithium niobate monocrystal 9 includes therein image information corresponding to the intensity distribution of the electric field, because the refractive index of the monocrystal 9 has been changed with the electric field. Consequently, a reproduced optical image corresponding to the original optical image appears on the glass plate 2.

In erasing the optical information having been written with a writing light WL, the movable contact of the switch SW is turned to a fixed contact E upon reception of a switch control signal supplied to the input terminal 11 of the switch SW so that the same potential is applied to the terminals 5 and 6 of the photo-photo conversion element PPC without generating an electric field between the transparent electrodes 3 and 4. In this condition an erase light EL having a uniform intensity distribution is applied from the glass plate 2.

According to the image pickup apparatus constructed of the photo-photo conversion element PPC having two transparent electrodes with at least a photoconductive layer, dielectric mirror and photo-modulation layer interposed therebetween, an electric charge image corresponding to the optical image of an object to be image picked up is formed through application of the optical image to the photo-photo conversion element PPC, and the electric charge image is optically read as optical image information which is then photoelectrically converted to obtain video signals with high resolution.

The photo-photo conversion element PPC constituting the image pickup apparatus is, as described above, of a laminated structure made of two transparent electrodes 3 and 4 between which there are provided the components including the photoconductive layer 7, dielectric mirror 8 and optical member 9 (e.g., photo-modulation layer such as lithium niobate monocrystal) which changes the light characteristics in accordance with the intensity distribution of an electric field applied thereto. Each of the components have a static capacitance. Consequently, because of the time constant of the photo-photo conversion element PPC, the electric charge amount of an electric charge image produced at the interface between the photoconductive layer 7 and dielectric mirror 8 increases as the time duration while the writing light is applied becomes long. The electric charge amount may eventually become saturated.

Further, if a new electric charge image is written in the photo-photo conversion element PPC, the old electric charge image on the same frame is first erased, and then the new electric charge image is written. In such a case, in generating time sequential video signals based on an electric charge image, the signal level of each video signal changes with the elapsed time after the erase operation was performed. Thus, a shading occurs in the image reproduced from such video signals.

Furthermore, as described later with FIG. 4, there is an image pickup apparatus of the type that an erase operation is performed during each vertical retrace blanking time, and a read operation is performed during the time other than the vertical retrace blanking time, respectively as shown in FIG. 6(a). In addition, a writing light of the optical image of an object is always applied to the photo-photo conversion element during the write operation. Therefore, time sequential video signals obtained from the photo-photo conversion element PPC have a shading.

Specifically, the electric charge amount of an electric charge image gradually increases during the write operation between two consecutive erase operations. Therefore, the amplitude of each video signal obtained based on such an electric charge image gradually increases.

Shading in video signals caused by the above-described reasons may be eliminated by independently and separately setting the write operation period and read operation period. However, in this case, light exposure time becomes short so that the level of a read-out signal becomes small. Further, video signals without shading can be obtained by setting the read, write and erase operation periods as desired, storing video signals obtained from the electric charge image in a memory such as a franme memory, and thereafter converting them into video signals conforming with a predetermined standard television system. However, this system requires high deflection frequencies and high video signal frequencies in order to allow high resolution of moving images so that the system is difficult to be practiced by using a frame memory presently available.

SUMMARY OF THE INVENTION

It is therefore an object of the present invention to provide an image pickup apparatus capable of reproducing an image signal without shading.

To achieve the above object, according to a first aspect of the present invention there is provided an image pickup apparatus comprising: means for forming an electric charge image corresponding to an optical image of an object to be image-picked up in a photo-photo conversion element constructed of two transparent electrodes with at least a photoconductive layer and a photo-modulation layer being interposed therebetween, by applying a light from said object to said photoconductive layer; means for reading said electric charge image corresponding to the optical image of said object as optical information, by applying a reading light to said photo-modulation layer; means for erasing said electric charge image corresponding to the optical image of said object, wherein an erase operation and read operation are intermettently repeated for said electric charge image; and said reading means operating in a limited period which is substantially short compared to a period in which said forming means operate.

According to a second aspect of the present invention there is provided an image pickup apparatus comprising: means for forming an electric charge image corresponding to the optical image of an object to be image-picked up in a photo-photo conversion element constructed of two transparent electrodes with at least a photoconductive layer and a photo-modulation layer being interposed therebetween, by applying a light from said object to said photoconductive layer; means for reading said electric charge image corresponding to the optical image of said object as optical information, by applying a reading light to said photo-modulation layer; means for erasing said electric charge image corresponding to the optical image of said object, wherein an erase operation and read operation are alternately and intermittently repeated for said electric charge image; means for applying the light from said object to said photo-photo conversion element via an optical shutter; and said reading means operating only in a period in which said light incident to said photo-photo conversion element is intercepted by said optical shutter.

According to a third aspect of the present invention there is provided an image pickup apparatus comprising: means for forming in a writing period an electrical charge image corresponding to an optical image of an object to be image-picked up a first photo-photo conversion element; means for transferring said electrical charge image formed in said first photo-photo conversion element to a second photo-photo conversion element during a period substantially shorter than said writing period by reading and writing said electrical charge image, optically at a time, from said first to second photo-photo conversion elements respectively; and means for reading optical image information of an optical image supplied to said second photo-photo conversion element by applying a reading light to the reading light input side of said second photo-photo conversion element.

According to a fourth aspect of the present invention there is provided an image pickup apparatus using a photo-photo conversion element comprising: means for controlling the operation of said image pickup apparatus so as to be executed within every horizontal scanning period, said operation including a write operation by write means for writing optical information of an object to be image-picked up into said photo-photo conversion element as an electric charge image, a read operation in a read period by read means for reading said electric charge image written in said photo-photo conversion element, and an erase operation in a erase period by erase means for erasing said electric charge image subsequent to said read operation therefor, said read period being preceded by said erase period; and means for outputting a time sequential signal by scanning two dimensionally said electric charge image with a reading light.

DETAILED DESCRIPTION OF THE PREFERRED EMBODIMENTS

The preferred embodiments of the present invention will now be described in detail with reference to the accompanying drawings.

Figure 1:
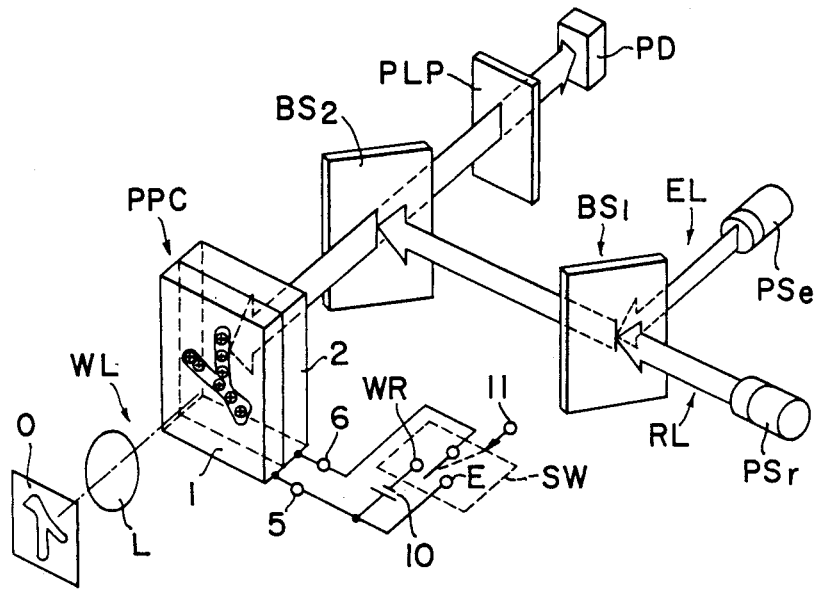
FIGS. 1 and 4 are schematic block diagrams showing the outline of two different embodiments of an image pickup apparatus according to the present invention.
Figure 4:
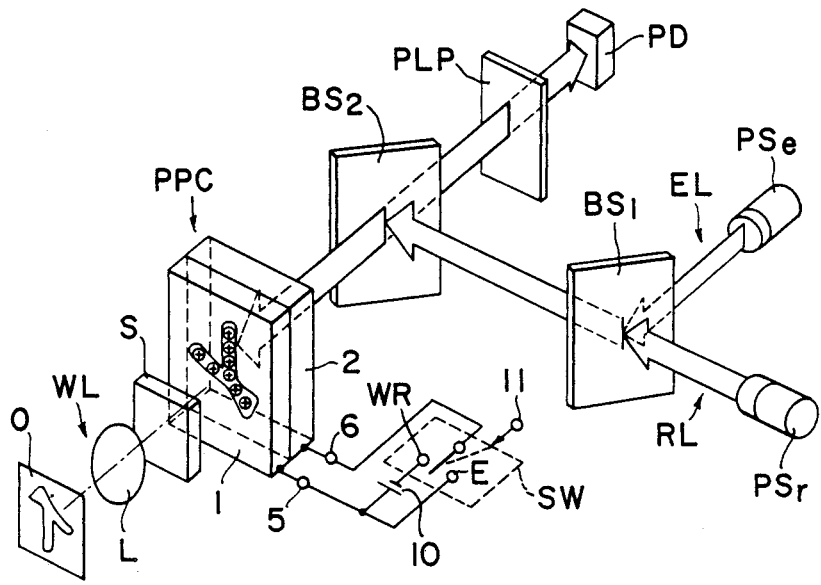

FIGS. 1 and 4 are schematic block diagrams showing two different embodiments of an image pickup apparatus according to the present invention. In FIGS. 1 and 4, a photo-photo conversion element PPC is generally indicated at reference numerals 1 and 2 which correspond to the glass plates 1 and 2 of the photo-photo conversion element PPC shown in FIG. 2, and for the simplicity purpose the other components of PPC are omitted in FIGS. 1 and 4. It is to be noted that the dielectric mirror having the wavelength selection characteristics that the writing and erasing lights are passed and the reading light is reflected may be omitted on condition that the photoconductive layer of PPC is insensitive to light and can reflect the reading light.

Referring now to FIGS. 1 and 4, O represents an object to be image-picked up, L a taking lens, BS1 and BS2 beam splitters, and PSr a light source for a reading light RL. In the following description, the light source PSr is assumed to be a laser beam projected through a laser beam scanner. PSe represents a light source for an erasing light EL, PLP a polarizer, PD a photodetector, 5, 6 and 11 terminals, 10 a power source, and SW a switch. S used in FIG. 4 represents an optical shutter which may be of the structure shown in FIG. 5.

Figure 5:
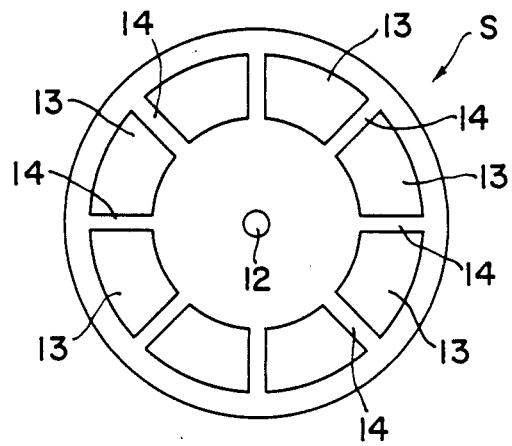
FIG. 5 is a plan view showing an example of an optical shutter.

In the optical shutter S shown in FIG. 5, 12 represents a rotary shaft, 13 a light transmission window, and 14 a light shielding area. While the optical shutter S rotates by means of a drive motor (not shown) driving the rotary shaft 12, a writing light incident to the optical shutter S via the taking lens L passes through the light transmission window 13 to the glass plate 1 of the photo-photo conversion element PPC, or is intercepted by the light shielding area 14.

The image pickup apparatus shown in FIGS. 1 and 2 will be described first. The optical image of the object O is applied as a writing light via the taking lens L to the glass plate 1 of PPC. In the write and read operation modes, a voltage from the power source is applied between the transparent electrodes 3 and 4 via the change-over switch with its movable contact turned to the fixed contact WR. Therefore, as described with FIG. 2, the writing light propagates along an optical path of glass plate 1, transparent electrode 3 and photoconductive layer 7 so that an electric charge image corresponding to the optical image of the incident light is generated at the interface between the photoconductive layer 7 and dielectric mirror 8 propagates along an optical path of glass plate 1, transparent electrode 3 and photoconductive layer 7 so that an electric charge image corresponding to the optical image of the incident light is generated at the interface between the photoconductive layer 7 and dielectric mirror 8 during a "STORE" period shown in FIG. 3(a).

In reading the electric charge image, a coherent reading light RL supplied from the light source PSr via the laser beam scanner is directed by the beam splitter BS₂ to the photo-photo conversion element PPC through the glass plate 2 thereof with the voltage from the power source 10 being applied via the switch SW between the transparent electrodes 3 and 4. In this case, the light source PSr is so controlled that the reading light RL is applied during the period as indicated by "READ" in FIG. 3(b) which is very short as compared with the "STORE" period in FIG. 3(a) or compared with the period indicated by "1 FRAME" in FIG. 3(a) which is a frame of a consequently obtained video signal. As an alternative, to the control of the light source PSr, the photodetector PD may be so controlled that it outputs only a signal corresponded to the "READ" period while the coherent reading light RL is continuously applied to PPC and the electric charge image is scanned multiple times within "1 FRAME" period. Therefore, video signals obtained during such a short period are less subjected to a shading.

The laser beam scanner may use a scanner of the type that a laser beam radiated from a laser source is two dimensionally deflected by a deflector and projected out as a light beam parallel to the optical axis of a lens system.

The laser beam radiated from the laser beam scanner passed through the beam splitter BS1 is reflected by the beam splitter BS2, and applied to the glass plate 2 of PPC. As described with FIG. 2, the reading light RL applied to the glass plate 2 propagates along the optical path of transparent electrode 4, lithium niobate monocrystal layer 9 and dielectric mirror 8. The dielectric mirror 8 has, as described previously, the wavelength selection characteristics that the light having the wavelength region of the reading light RL is reflected and the light having the wavelength region of the erasing light EL is passed. The reading light reflected by the dielectric mirror 8 returns to the glass plate 2. In this case, since the refractive index of the lithium niobate monocrystal 9 changes with the electric field applied thereto because of an electrooptical effect, the reflected reading light RL contains therein image information corresponding to the intensity distribution of the electric field. Thus, an optical image modulated correspondingly to the electric charge image appears on the glass plate 2.

The optical image time sequentially read by using the laser beam scanner is supplied to the photodetector PD passing through the beam splitter BS2 and polarizer PLP to thus obtain video signals of the optical image of the object O as an output from the photodetector PD.

In order to write a new optical image by using the image pickup apparatus shown in FIG. 1, it becomes necessary to erase an old optical image i.e. the corresponding electric charge image previously written in PPC before writing the new optical image as an electric charge image. The erasing must be done within one frame period shown in FIG. 3(a).

Figure 3:
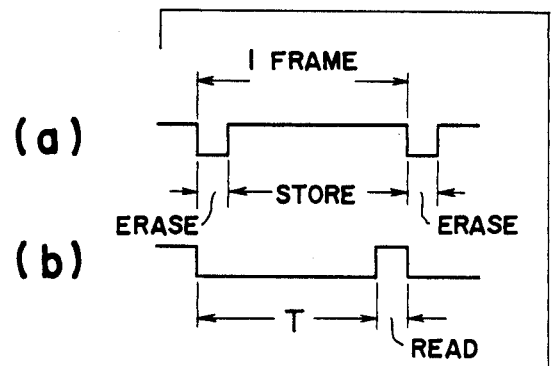
FIG. 3 is a timing chart for illustrating the operation of the image pickup apparatus shown in FIG. 1.

The erasing an old optical image during the period indicated by "ERASE" in FIG. 3(a) corresponding to the vertical retrace blanking period of video signals, the movable contact of the switch SW is turned to the fixed contact E upon reception of a switch control signal supplied to the input terminal 11 so that the transparent electrodes 3 and 4 are electrically shorted and made to a common potential to thus apply no electric field between opposite sides of the photoconductive layer 7. In this condition, an erasing light EL is applied to the glass plate 2 of PPC via the beam splitters BS1 and BS2.

Figure 2:
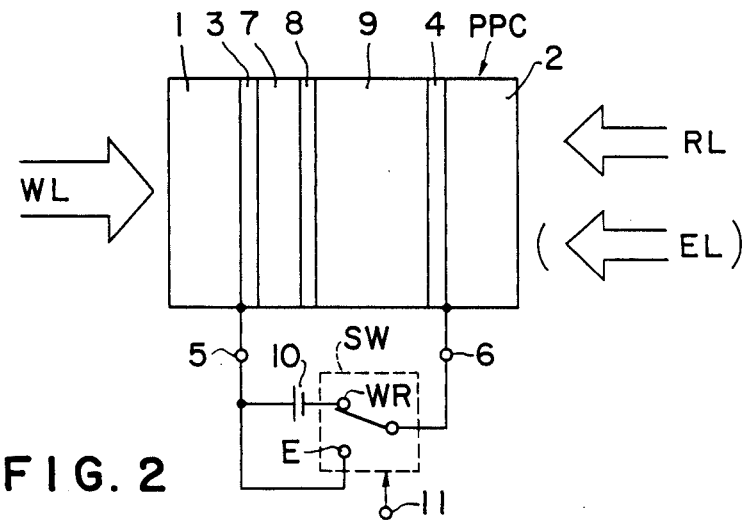
FIG. 2 is a schematic block diagram showing an example of a photo-photo conversion element.

The erasing light EL passes, as described with FIG. 2, along the optical path of glass plate 2, transparent electrode 4, lithium niobate monocrystal layer 9, dielectric mirror 8 and photoconductive layer 7. The resistance value of the photoconductive layer 7 is lowered by the erasing light EL so that the electric charge image formed at the interface between the photoconductive layer 7 and dielectric mirror 8 is erased.

In a conventional moving image pickup mode, an electric charge image is written or stored at the interface between the photoconductive layer 7 and dielectric mirror 8 during the period indicated by "STORE" in FIG. 3(a) and the read operation thereof is performed simultaneously during the same period, resulting in a shading of reproduced images. However, in this embodiment, the read operation is performed only during the period indicated by "READ" in FIG. 3(b) which is extremely short as compared with the period indicated by "1 FRAME" in FIG. 3(a) whereas the erasing and storing are performed as shown in FIG. 3(a). Therefore, a change in the amount of stored electric charge during such a short "READ" is small although electric charge continues to be accumulated during the short reading period. It is therefore apparent that an amount of the shading is greatly limited. The period indicated by "T" included in one frame period shown in FIG. 3(b) indicates a period in which no reading is performed.

As apparent from the foregoing description of the image pickup apparatus shown in FIG. 1, video signals are generated during the short read period within the store period. Therefore, a reproduced image obtained from such video signal has practically no shading.

The image pickup apparatus shown in FIG. 4 will be described next. The optical image of the object O is applied as a writing light via the taking lens L and the light transmission window 13 to the glass plate 1 of PPC while the optical shutter S is at an open position, and not applied to the glass plate 1 by the light shielding areas 14 when the optical shutter is in a closed position.

Figure 6:
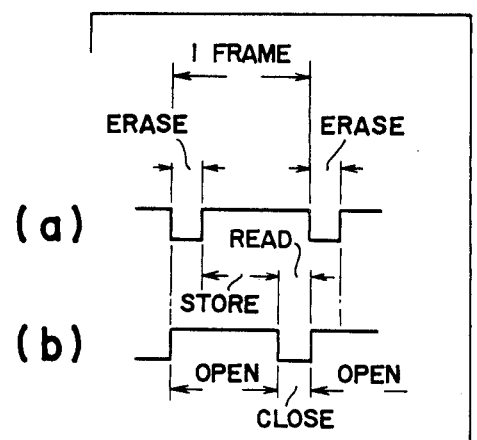
FIG. 6 is a timing chart for illustrating the operation of the image pickup apparatus shown in FIG. 4.

The open/close state of the optical shutter S is shown in FIG. 6(b). FIG. 6(a) shows the erase and store periods within one frame period similar to those shown in FIG. 3(a).

In the write and read operation modes, a voltage from the power source 10 is applied between the transparent electrodes 3 and 4 via the change-over switch with its movable contact turned to the fixed contact WR. Therefore, as described with FIG. 2, the writing light WL propagates, while the optical shutter is at the open position, via the light transmission window 13 along an optical path of glass plate 1, transparent electrode 3 and photoconductive layer 7 so that an electric charge image corresponding to the optical image of the incident light is generated at the interface between the photoconductive layer 7 and dielectric mirror 8.

While on the other hand the optical shutter S is at the closed position, the optical image of the object O is intercepted by the light shielding area 14 so that no charge is accumulated in the photo-photo conversion element by the writing light WL. During such period while the writing light WL is not applied to the photo-photo conversion element PPC, a read operation by the reading light RL is performed for the image pickup apparatus shown in FIG. 4.

Specifically, in reading the electric charge image, a coherent reading light RL supplied from the light source PSr via the laser beam scanner is applied to the photo-photo conversion element PPC from the glass plate 2 with the voltage from the power source 10 being applied via the switch SW between the transparent electrodes 3 and 4. In this case, the reading light RL is applied during the period as indicated by "READ" in FIG. 6(b) which is very short as compared with the period indicated by "1 FRAME" in FIG. 6(a).

During the read period, the optical shutter S is at the closed position thus no electric charge due to the incoming light is accumulated in the photo-photo conversion element PPC. Therefore, there occurs by all means no shading in time sequential video signals to be generated from the electric charge image formed at the interface between the photoconductive layer 7 and dielectric mirror 8 corresponding to the optical image of the incident light.

The laser beam scanner may use a scanner of the type that a laser beam radiated from a laser source is two dimensionally deflected by a deflector and projected out as a light beam parallel to the optical axis of the lens system.

The laser beam radiated through the laser beam scanner transmitted through the beam splitter BS1 is reflected by the beam splitter BS2, and applied to the glass plate 2 of PPC. As described with FIG. 2, the reading light RL applied to the glass plate 2 propagates along the optical path of transparent electrode 4, lithium niobate monocrystal layer 9 and dielectric mirror 8. The dielectric moirror 8 has, as described previously, the wavelength selection characteristics that the light having the wavelength region of the reading light RL is reflected and the light having the wavelength region of the erasing light EL is passed. The reading light reflected accordingly by the dielectric mirror 8 returns to the glass plate 2. In this case, since the refractive index of the lithium niobate monocrystal 9 changes with the electric field applied thereto because of an electrooptical effect, the reflected reading light RL contains therein image information corresponding to the intensity distribution of the electric field. Thus, an optical image corresponding to the electric charge image appears on the glass plate 2.

The optical image time sequentially read by using the laser beam scanner is supplied to the photodetector PD via the beam splitter BS2 and polarizer PLP to thus obtain video signals of the optical image of the object O from the photodetector PD.

In order to write a new optical image by using the image pickup apparatus shown in FIG. 4, it becomes necessary to erase within one frame period an old optical image previously written in PPC one frame period as shown in FIG. 6(a)

In erasing an old optical image during the period indicated by "ERASE" in FIG. 6(a) corresponding to the vertical retrace blanking period of video signals, the movable contact of the switch SW is turned to the fixed contact E upon reception of a switch control signal supplied to the input terminal 11 so that the transparent electrodes 3 and 4 are electrically shorted and made to a common potential to thus apply no electric field between opposite sides of the photoconductive layer 7. In this condition, an erasing light EL from the light source PSe is applied to the glass plate 2 of PPC via the beam splitters BS1 and BS2.

The erasing light EL passes, as described with FIG. 2, along the optical path of glass plate 2, transparent electrode 4, lithium niobate monocrystal layer 9, dielectric mirror 8 and photoconductive layer 7. The resistance value of the photoconductive layer 7 is lowered by the erasing light EL so that the electric charge image formed at the interface between the photoconductive layer 7 and dielectric mirror 8 is erased.

During the period indicated by "STORE" in FIG. 6(b) while the optical shutter S is at an open position, an electric charge image is formed at the interface between the photoconductive layer 7 and dielectric mirror 8 of PPC by the writing light. During the period indicated by "ERASE" in FIG. 6(a), even if the writing light is applied to PPC, no charge is accumulated therein because of the application of the erasing light at the same time.

In a conventional moving image pickup mode, an electric charge image is written at the interface between the photoconductive layer 7 and dielectric mirror 8 during the period other than the ERASE period shown in FIG. 6(a) and the read operation thereof is performed simultaneously during the same period, resulting in a shading of reproduced images. However, in this embodiment, the read operation is performed only during the period indicated by "READ" in FIG. 6(b) where the optical shutter S is at the closed position. Therefore, it is apparent that a change in the amount of stored charge during such a period is nil and that there is no shading at all in the time sequentially generated video signals.

As apparent from the foregoing description of the image pickup apparatus shown in FIG. 4, a read operation is performed during the period while the optical shutter S is at the close position and there is no change in the amount of stored charge during such a period. Therefore, time sequentially generated video signal during such a period has no shading.

As the reading, writing and erasing lights, it is apparent that any lights, i.e., electromagnetic waves having a desired spectral frequency range may be used.

As appreciated from the foregoing description of the image pickup apparatus of the embodiment, video signals are generated during a very short period within the one frame period excepting the erase period. Therefore, not much shading occurs in an image reproduced from the video signals. According to another modification, a read operation is carried out during the short period within the one frame period except the erase period while the optical shutter S is at the closed position. Therefore, no shading occurs in time sequentially generated video signals. The present invention accordingly can eliminate all the above-described prior art problems.

Figure 7:
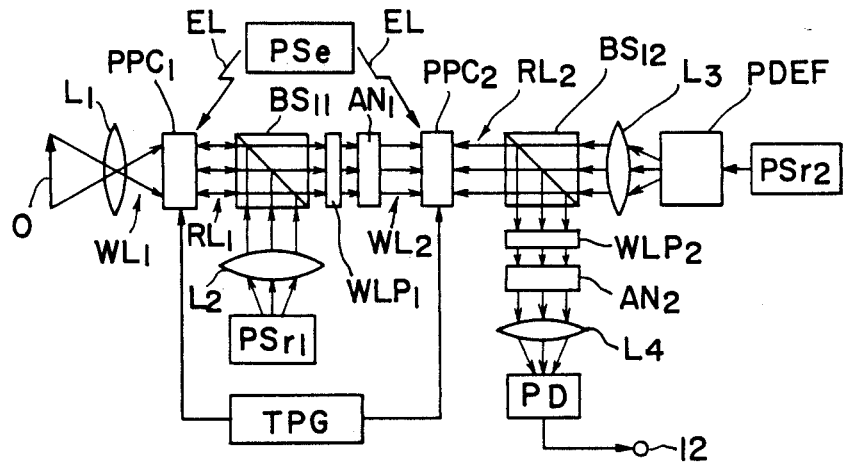
FIG. 7 is a schematic block diagram showing another embodiment of an image pickup apparatus according to the present invention.

FIG. 7 is a schematic block diagram showing another embodiment of the image pickup apparatus according to the present invention. The image pickup apparatus shown in FIG. 7 uses first and second photo-photo conversion elements PPC1 and PPC2 which may be of the structure as shown in FIG. 2. However, in this embodiment, PPC1 and PPC2 have different structures each other as particularly shown in FIG. 8.

Figure 8:
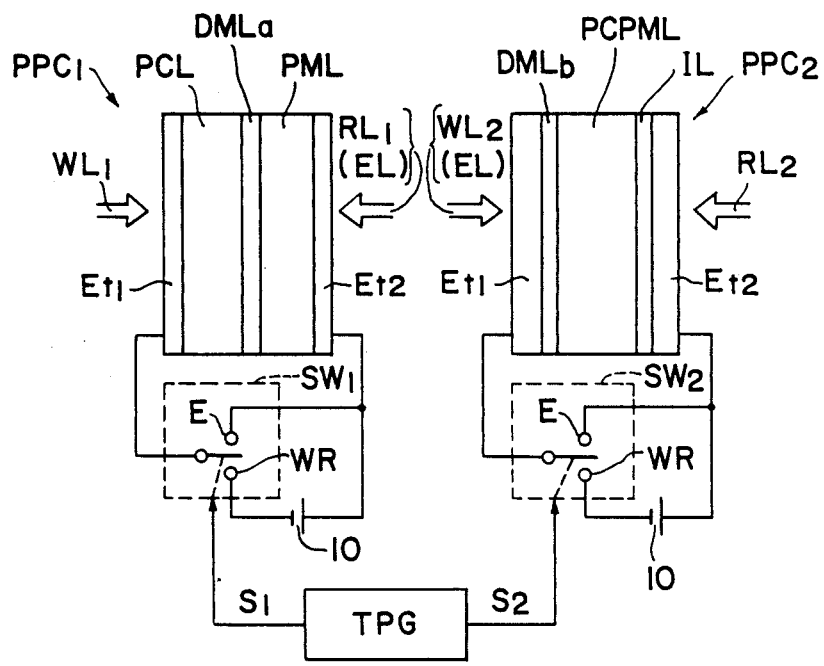
FIG. 8 shows an example of the photo-photo conversion units used in the image pickup apparatus shown in FIG. 7.

The first photo-photo conversion element PPC1 is constructed of, as shown in FIG. 8, transparent electrodes Et1 and Et2, a photoconductive layer PCL, a dielectric mirror DMLa and a photo-modulation layer PML. The dielectric mirror DMLa has the wavelength selection characteristics that the light having a wavelength region of a first reading light RL1 is reflected and the light having a wavelength region of an erasing light is passed. The dielectric mirror DMLa may use a dichroic mirror of a multi-layer composed of, e.g., thin films of $SiO_2$ and $TiO_2$. The photo-modulation layer PML (e.g., lithium niobate monocrystal) changes the refractive index of light in accordance with the electric field applied thereto because of a linear electrooptical effect.

As a manner of fact, the first photo-photo conversion element PPC1 shown in FIG. 8 has the same structure as shown in FIG. 2 where the glass plates 1 and 2 in FIG. 2 are omitted in FIG. 8 for illustration convenience. The read, write and erase operations are the same as the photo-photo conversion element PPC described with FIG. 2. Change-over switches SW1 and SW2 which change their connection state in accordance with outputs S1 and S2 from a timing pulse generator TPG and operate in the same manner as described with FIG. 2.

The second photo-photo conversion element PPC2 is constructed of, as shown particularly in FIG. 8, transparent electrode Et1 and Et2, a dielectric mirror DMLb having the wavelength selection characteristics that the light having a wavelength region of the writing and erasing lights is passed and the light having a wavelength region of the reading light is reflected, and a photo-modulation layer PCPML (e.g., bismuth silicate) having both the photoconductive effect and linear electrooptical effect. The photo-modulation layer PCPML of the second photo-photo conversion element PPC2 realizes the function of both PCL and PML of the first photo-photo conversion element PPC1 which may be replaced with the PPC1 using the photo-modulation member made of a lithium niobate monocrystal.

Referring again to FIG. 7, a writing light WL1 of an optical image of an object O to be image picked up is incident to the first photo-photo conversion element PPC1 while being focussed thereon by means of a taking lens L1.

Upon application of the writing light WL1, an electric charge image corresponding to the image of the object O is formed at the interface between the photoconductive layer PCL and dielectric mirror DMLa of PPC1.

In reading the electric charge image, a first reading light RL1 having a large cross sectional area supplied from a first reading light source PSr1 with no scanner and magnified by a lens L2 is applied to a first beam splitter BS11 and to the whole input surface of PPC1 at the same time.

The reading light RL1 incident to the first photo-photo conversion element PPC1 propagates along the optical path of transparent electrode Et2, photo-modulation layer PML made of lithium niobate monocrystal, and dielectric mirror DMLa. The reading light RL1 reflected by the dielectric mirror DMLa returns to the transparent electrode Et2 via the photo-modulation layer PML.

Since the refractive index of the lithium niobate monocrystal constituting the photo-modulation layer PML changes with the electric field because of the linear electrooptical effect, the reflected reading light RL1 contains therein image information corresponding to the intensity distribution of the electric field applied to the lithium niobate monocrystal. The reproduced optical image from the first photo-photo conversion element PPC1 then advances to the first beam splitters BS11 and is applied via a wave plate WLP1 and polarizer AN1 to the second photo-photo conversion element PPC2 as a second writing light WL2.

As described previously, since the reading light RL1 applied to the first photo-photo conversion element PPC1 has a cross sectional area sufficiently large for irradiating the whole input area of PPC1 at a time, the reproduced optical image is read from the entire area of PPC1 simultaneously and supplied to PPC2 as the second writing light WL2.

Therefore, it is obvious that the optical image read from PPC1 and applied to PPC2 done simultaneously of their respective areas has no shading. The read period relative to PPC1 is optional. Even if the read period is short, the optical image read from PPC1 and written into PPC2 can be made sufficiently bright if the intensity of the reading light for PPC1 is made large.

Upon application of the second writing light WL2 to PPC2, an electric charge image corresponding to the optical image is formed at the interface between the photo-modulation layer (e.g., made of bismuth silicon oxide) having both the photoconductive effect and linear electrooptical effect and insulation layer IL of the second photo-photo conversion element.

In reading the electric charge image formed in PPC2, a second reading light RL2 emitted from a light source PSr2 and two dimensionally deflected by a photo-deflector PDEF is used. The second reading light RL2 advances to the second beam splitter BS12 then to the input side of PPC2.

The second reading light RL2 propagates along the optical path of transparent electrode Et2, insulation layer IL, photo-modulation layer PCPML, and dielectric mirror DMLb. The second reading light RL2 reflected by the dielectric mirror DML returns again to the beam splitter BS12 via photo-modulation layer PCPML, insulation layer IL and transparent electrode Et2. This returned reading light now contains a reproduced optical image corresponding to the object O.

The reproduced optical image read from PPC2 is supplied via a wave plate WLP2, polarizer AN2 and lens L4 to a photodetector PD whereat it is photoelectrically converted into time sequential video signals which are delivered to an output terminal 12.

The video signals at the output terminal 12 conform with a desired television system in accordance with the horizontal and vertical deflection frequencies used by the photo-deflector PDEF.

The timing pulse generator TPG generates control signals which control the timings of the read, write and erase operations of the first and second photo-photo conversion elements PPC1 and PPC2. The timing pulse generator TPG also controls the operation timings of the erase light source PSe shown in FIG. 7.

Figure 9:
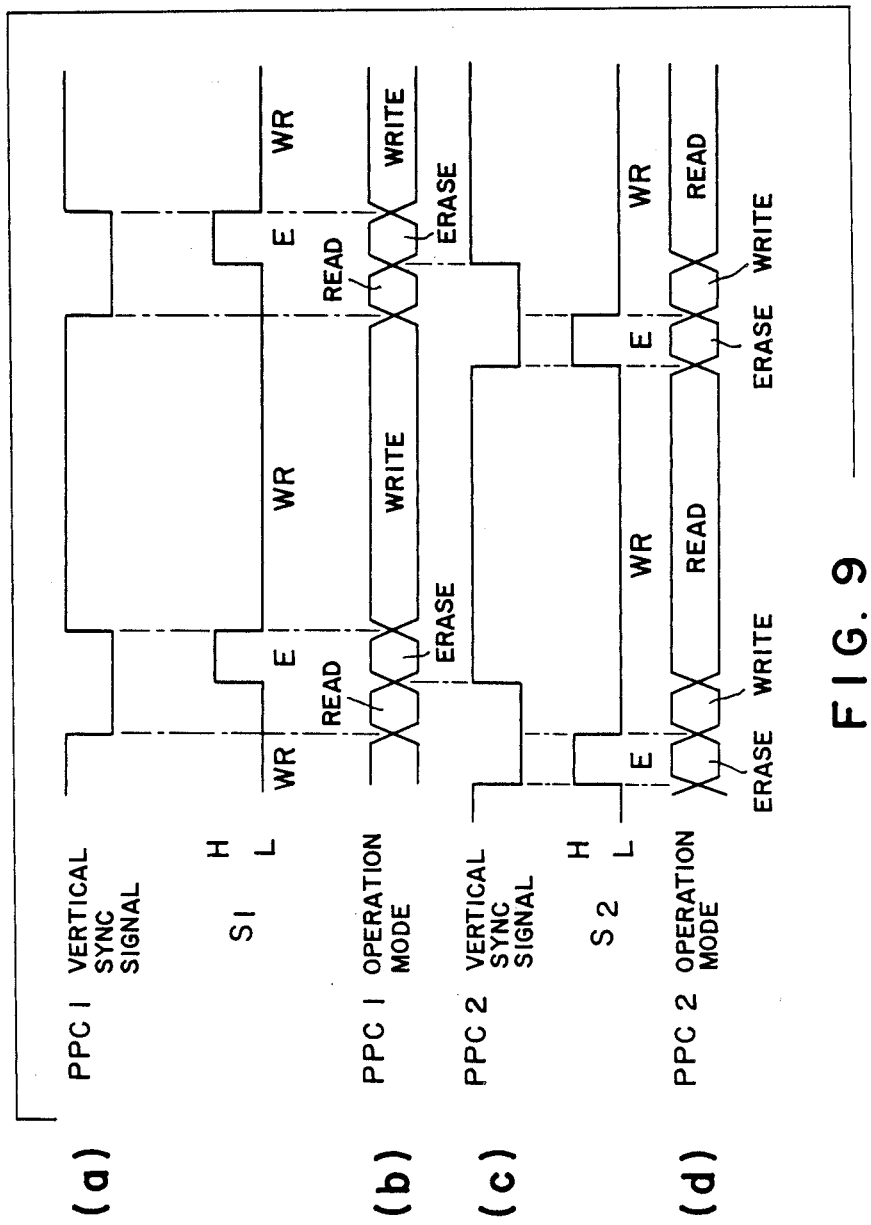
FIG. 9 is a timing chart for illustrating the operation of the image pickup apparatus shown in FIG. 7.

FIG. 9 is a timing chart illustrating the read, write and erase operations of PPC1 and PPC2. FIG. 9(a) shows a vertical synchro signal and an output S1 from TPG respectively for PPC1, FIG. 9(b) shows the timings of the read, write and erase operations of PPC1, FIG. 9(c) shows a vertical sync signal and an output S2 from TPG respectively for PPC2, and FIG. 9(d) shows the timings of the read, write and erase operations of PPC2.

According to the above embodiments, the reading light RL1 for the first photo-photo conversion element PPC1 has a cross sectional area sufficiently large for applying it to the whole input surface of PPC1 at a time and the read period is substantially short compared to the one vide frame period i.e. the interval of the vertical sync pulses. The electric charge image is optically reproduced simultaneously and supplied to the second photo-photo conversion element PPC2. Therefore, no shading develops in the reproduced optical image which is written in PPC2. Further, the read period relative to the first photo-photo conversion element PPC1 is optional. Even if a short read period is used, the optical image to be written to the second photo-photo conversion element PPC2 can be made sufficiently bright if a relatively strong intensity of the reading light for PPC1 is used. Furthermore, the electric charge in the second photo-photo conversion element PPC2 can be read in any desired pattern of scanning, so that video signals conforming with a desired standard television system can be obtained. Thus, the invention can effectively solve the aforementioned prior art problems.

Figure 10:
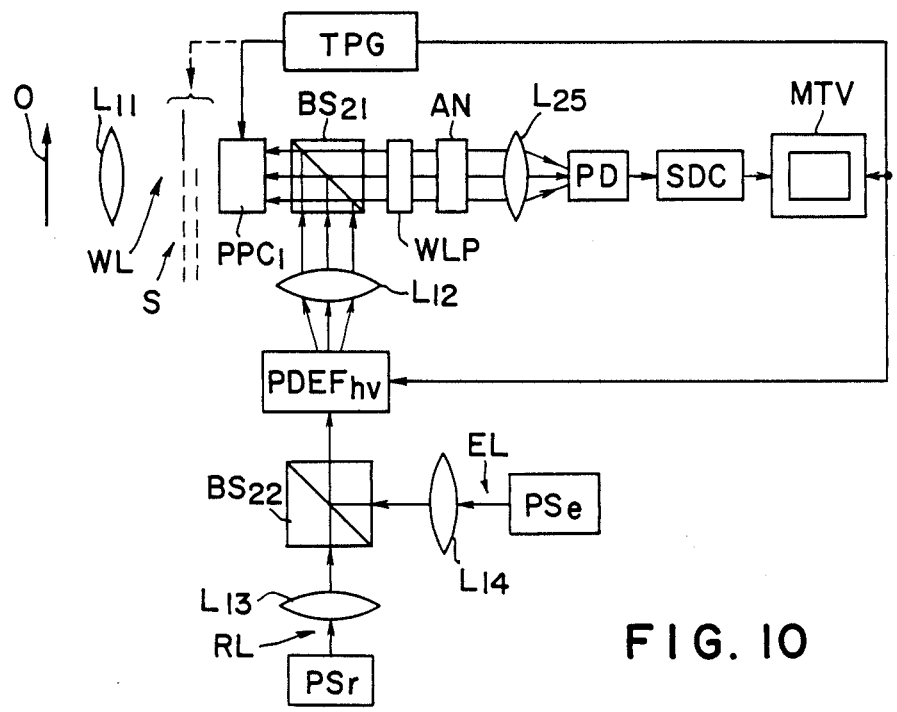
FIGS. 10 and 13 are schematic block diagrams showing still further embodiments of an image pickup apparatus according to the present invention.
Figure 13:
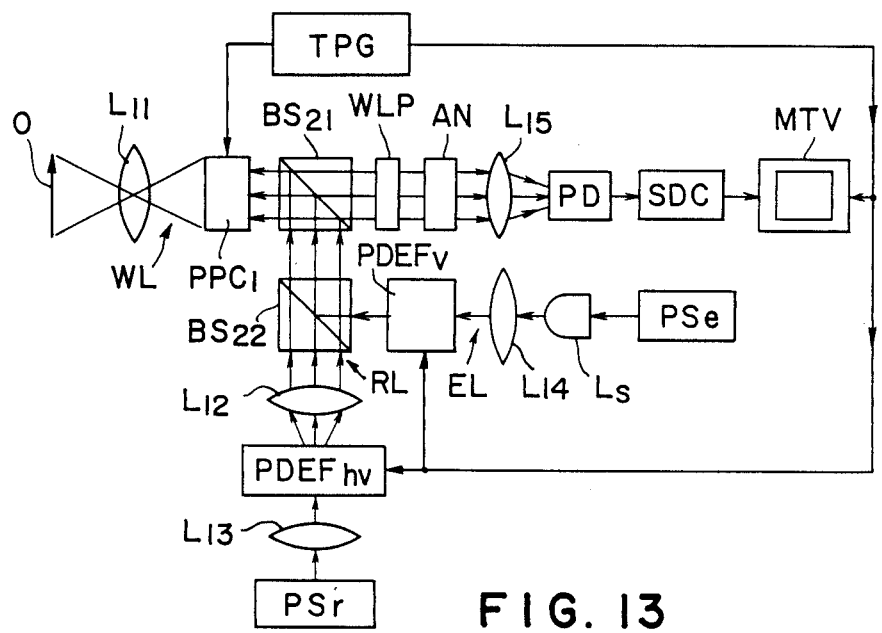

FIGS. 10 and 13 are schematic block diagrams showing still further embodiments of an image pickup apparatus of this invention. The photo-photo conversion element PPC1 used in the embodiments has the structure as shown in FIG. 8 and the detail of the structure is omitted in FIGS. 10 and 13.

Referring to FIGS. 10 and 13, O represent an object to be image-picked up, L11 a taking lens, L12 an $f\theta$ lens (doublet spherical lens), L13 and L14 lenses, BS21 and BS22 beam splitters, WLP a wave plate, AN a polarizer, PD a photodetector, SDC a signal processor, MTV a monitor television, PSr a light source for a reading light RL, PSe a light source for an erasing light EL, and TPG a timing pulse generator. In FIG. 10 S represents an optical shutter, and PDEFhv a photo-deflector for delfecting a light beam in the horizontal and vertical directions. In FIG. 13, PDEFv represents a photo-deflector for deflecting a light beam in the vertical direction, and Ls a cylindrical lens for converging a light in a line.

First, the image pickup apparatus shown in FIG. 10 will be described. An optical image of an object O is applied to the photo-photo conversion element PPC1 as the reading light WL via the taking lens L and optical shutter S. As described with FIG. 8, in the write mode of PPC1, a voltage from the power source 10 is applied between the transparent electrodes Et1 and Et2 via the movable contact and fixed contact WR of the change-over switch SW. Therefore, the writing light WL applied to PPC1 is projected to the photoconductive layer PCL via the transparent electrode Et1 such that an electric charge image corresponding to the optical image of the incident light is formed at the interface between the photoconductive layer PCL and dielectric mirror DML of the PPC1.

In reading the electric charge image thus formed at the interface between the photoconductive layer PCK and dielectric mirror DML, a reading light RL is applied to the transparent electrode Et2.

Figure 11:
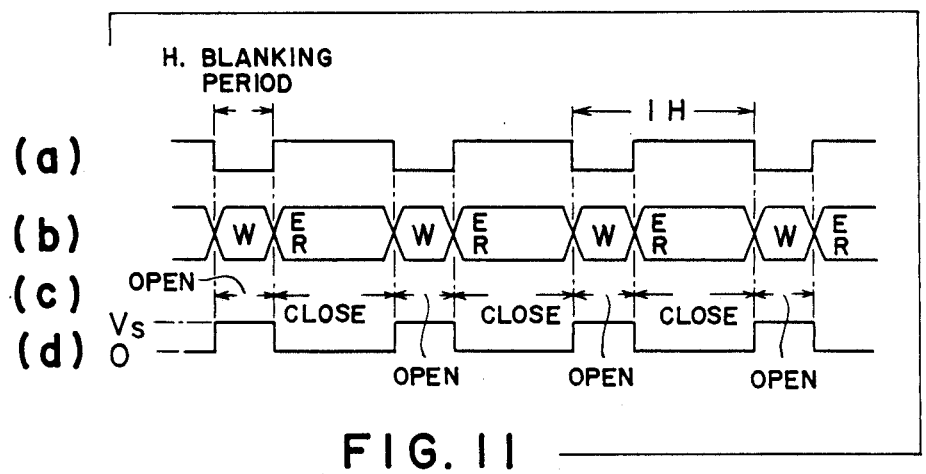
FIG. 11 is a timing chart for illustrating the operation of the image pickup apparatus shown in FIG. 10.

In the previously described read operation of the photo-photo conversion element PPC shown in FIG. 8, the voltage of the power source 10 is applied between the transparent electrode Et1 and Et2 via the change-over switch SW1, 2. The voltage is applied because the read operation is performed within the period of write operation which requires the voltage. However, the image pickup apparatus shown in FIG. 10 uses the optical shutter such that the read operation of an electric charge image is performed during the period the writing light is interrupted to the photo-photo conversion element PPC1 due to the closed position of the optical shutter. Therefore, as shown in FIG. 11(d), during the read operation the movable contact of the switch SW is tuned to the fixed contact E so that voltage Vs is not applied to the two electrodes Et1 and Et2.

The reading light emitted from the laser light source PSr is applied via the lens L13, beam splitter BS22 to the photo-deflector PDEFhv whereat it is deflected vertically and horizontally in accordance with the desired scanning pattern. The reading light RL is then applied to the $f\theta$ lens L12 and to the beam splitter BS21 and transparent electrode Et2 of the PPC1.

Figure 16:
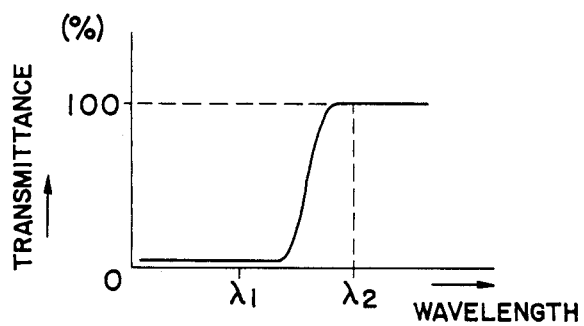
FIG. 16 is a graph showing the light transmittance characteristics relative to wavelength of a dielectric mirror used in the photo-photo conversion element shown in FIG. 8.

The reading light applied to the transparent electrode Et2 propagates, as described with FIG. 8, along the optical path of transparent electrode Et2, photomodulation layer PML, and dielectric mirror DML. The dielectric mirror DML has the wavelength selection characteristics as shown in FIG. 16 that the light having a wavelength region of the reading light RL is reflected and the light having a wavelength region of the erasing light EL is transmitted. Therefore, the reflected reading light RL returns to the transparent electrode Et2.

Since the refractive index of the lithium niobate monocrystal of the photo-modulation layer PML changes with the electric field generated by the electric charge image because of the linear electrooptical effect, the reflected reading light RL contains therein image information corresponding to the intensity distribution of the electric field. Thus, the reproduced optical image appears on the transparent electrode Et2 as scanned in accordance with the photo-deflector. The reproduced optical image is applied to the photodetector PD via the beam splitter BS21, wave plate WLP, polarizer AN and converging lens L25. Video signals corresponding to the optical image of the object O are outputted from the photodetector PD and supplied to the signal processor SDC whereat they are converted into video signals conforming with the predetermined standard television system. The processed video signals are then supplied to the monitor television MTV.

In erasing the electric charge image, the movable contact of the switch SW is turned to the fixed contact E as described with FIG. 8 to electrically short the transparent electrode Et1 and Et2 and have the common potential without electric field being applied between opposite ends of the photoconductive layer PCL. In this condition, an erasing light EL emitted from the light source PSe is applied to the photo-deflector PDEFhv via the lens L14 and beam splitter BS22. The photo-deflector PDEFhv deflects the erasing light in a predetermined scan pattern. The deflected erasing light EL is then applied to the $f\theta$ lens L12 and to the transparent electrode Et2 via the beam splitter BS21.

The erasing light EL applied to the transparent electrode Et2 of the photo-photo conversion element PPC propagates, as previously described with FIG. 8, along the optical path of transparent electrode Et2, lithium niobate monocrystal PML, dielectric mirror DML and photoconductive layer PCL. The resistance value of the photoconductive layer PCL is made low by the erasing light EL to thus erase the electric charge image formed at the interface of the photoconductive layer PCL and dielectric mirror DML.

As shown in FIGS. 11(a) and (b), the period during which the writing light WL is supplied to the photo-photo conversion element PPC is the horizontal retrace blanking period (W), the period during which the reading and erasing lights RL and EL are applied to the photo-photo conversion element PPC is the period (R, E) other than the horizontal retrace blanking period. The optical shutter is made open during the horizontal retrace blanking period during which the writing light is supplied to PPC, and is made close during the period (R) during which the reading light is supplied to PPC.

Figure 12:
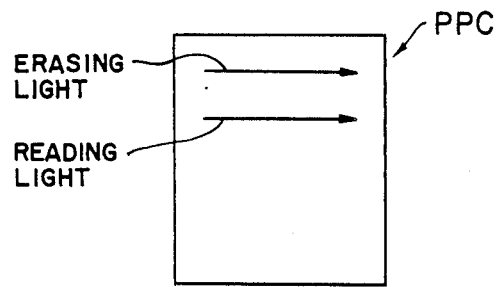
FIGS. 12 and 14 are graphs showing the timings of erasing light and reading light.

The writing light WL during each horizontal retrace blanking period is applied to the whole input surface of the transparent electrode Et1 of PPC at the same time. The reading light RL and erasing light EL are scanned with the photo-deflector PDEFhv in a predetermined scanning pattern. After the read operation for a horizontal scan line image, the erase operation therefor is performed. Such operation is illustratively shown in FIG. 12 wherein a scanning spot runs progressively from the left to the right and from the up to the down.

Assuming that there are N horizontal scanning periods in a time span from the moment of the erase operation for a certain scanning line of a picture to the moment of the subsequent erase operation for the same scanning line, then the exposure period of the writing light WL to PPC1, during which period electric charge for each of the scanning lines to be read after has been accumulated, becomes N×(one horizontal retrace blanking period).

According to the image pickup apparatus shown in FIG. 10, as shown in FIG. 11(c), the optical image of the object O is supplied to the photo-photo conversion element PPC1 via the taking lens L11 and optical shutter S only during the write operation, by opening the optical shutter S. In the other operations, the optical shutter is closed so as not to apply the optical image of the object to the photo-photo conversion element PPC1. The optical shutter is controlled by a control signal generated by the timing pulse generator TPG. It is therefore apparent that there is no shading in video signals generated from the optical image information read from PPC1.

Next, the image pickup apparatus shown in FIG. 13 will be described. The optical image of the object O is applied as a writing light WL to the photo-photo conversion element PPC1 via the taking lens L11. In this embodiment, the writing light is always supplied to PPC1 even during the period the read operation is performed, in the same manner as described with FIG. 8.

In the read and write operations of the image pickup apparatus shown in FIG. 13, a voltage of the power source 10 is applied between the transparent electrodes Et1 and Et2 via the movable contact and fixed contact WR of the switch SW1.

In the write operation, the writing light WL as the optical image of the object O is applied to PPC1. The writing light WL propagates to the photoconductive layer PCL via the transparent electrode Et1 so that an electric charge image corresponding to the incident light is formed at the interface between the photoconductive layer PCL and dielectric mirror DML.

In reading the electric charge image formed at the interface, the reading light RL is applied to the transparent electrode Et2 of PPC1 with the voltage of the power source 10 being applied between the transparent electrodes Et1 and Et2 via the switch SW1.

The reading light RL emitted from the light source PSr is applied via the lens L13 to the photo-deflector PDEFhv. The reading light RL deflected in a predetermined scanning pattern by the photo-deflector PDEFhv is applied to the transparent electrode Et2 via the optical path of fθ lens L12, and beam splitters BS22 and BS21.

The reading light RL applied to the transparent electrode Et2 propagates, as described with FIG. 8, along the optical path of transparent electrode Et2, photo-modulation layer PML and dielectric mirror DML. The dielectric mirror DML has the wavelength characteristics shown in FIG. 16 that the light having a wavelength region of the reading light is reflected and the light having a wavelength region of the erasing light is passed. Therefore, the reading light RL is reflected by the dielectric mirror DML and returned to the transparent electrode Et2.

Since the refractive index of the photo-modulation layer PML changes with the electric field because of the linear electrooptical effect, the reflected reading light RL contains therein image information corresponding to the intensity distribution of the electric field. Thus, the reproduced optical image appears on the transparent electrode Et2 as scanned in accordance with the photodeflector PDEFhv. The reproduced optical image is applied to the photodetector PD via the beam splitter BS21, wave plate WLP, polarizer AN and converging lens L15. Video signals corresponding to the optical image of the object O are outputted from the photodetector PD and supplied to the signal processor SDC whereat they are converted into video signals conforming with the predetermined standard television system. The processed video signals are then supplied to the monitor television MTV.

In erasing the electric charge image, the movable contact of the switch SW1 is turned to the fixed contact E as described with FIG. 8 to electrically short the transparent electrodes Et1 and Et2 to have a common potential without electric field being applied between opposite ends of the photoconductive layer PCL. In this condition, an erasing light EL emitted from the light source PSe is converged into a form of horizontal line by the cylindrical lens Ls and applied to the photodeflector PDEFv via the lens L14. The photo-deflector PDEFhv deflects the erasing light only in the vertical direction. The deflected erasing light EL is then applied to the transparent electrode Et2 via the beam splitters BS22 and BS21.

The erasing light EL applied to the transparent electrode Et2 of the photo-photo conversion element PPC propagates, as previously described with FIG. 8, along the optical path of transparent electrodes Et2, photo-modulation layer PML, dielectric mirror DML and photoconductive layer PCL. The resistance value of the photoconductive layer PCL is made low by the erasing light EL to thus erase the electric charge image formed at the interface of the photoconductive layer PCL and dielectric mirror DML.

Figure 15:
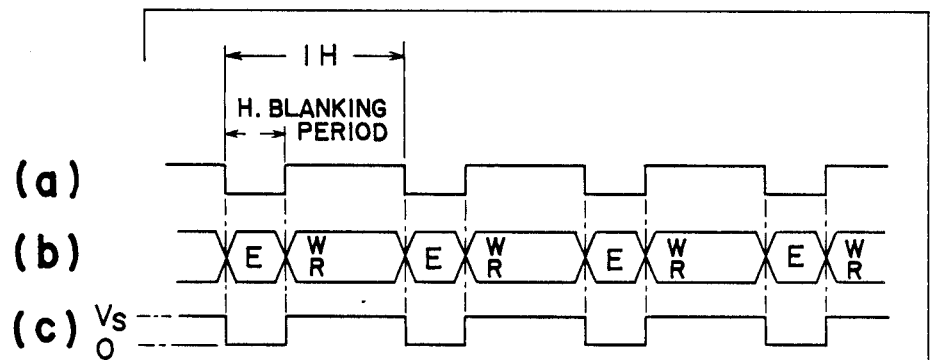
FIG. 15 is a timing chart for illustrating the operation of the image pickup apparatus shown in FIG. 13.

As shown in FIGS. 15(a) and (b), the period during which the erasing light EL is supplied to the photo-photo conversion element PPC1 is the horizontal retrace blanking period (E), the period during which the writing light WL and reading light RL are applied to the photo-photo conversion element PPC1 is the period (W, R) other than the horizontal retrace blanking periopd. FIG. 15(c) shows the voltage Vs applied between the transparent electrodes Et1 and Et2 during respective operation modes of the photo-photo conversion element PPC1.

The erase operation is performed sequentially for each horizontal scanning line after subjected to the read operation, by using the erasing light in the form of line (see FIG. 14) while sequentially shifting the erasing light in the vertical direction. It should be noted that the erasing light is not progressively scanning horizontally in this case but horizontally scanning erasing light may be used in the same manner as of the embodiment shown in FIG. 13.

The writing light WL is always supplied to the whole input surface of the transparent electrode Et1 of PPC1, while the reading light RL is applied to the transparent electrode Et2 sequentially for each horizontal line during the period other than the horizontal retrace blanking period, when being scanned with the photo-deflector PDEFhv in a predetermined scanning pattern.

Figure 14:
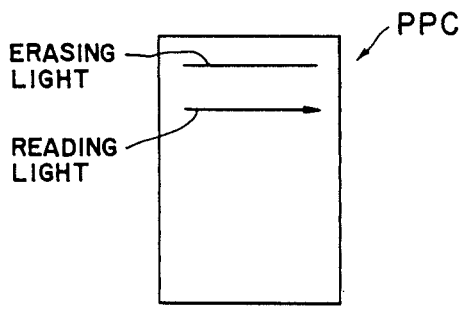

After the read operation for a certain scanning line has been completed, the erase operation for the same scanning line is performed. FIG. 14 illustrates that the scanning line already subjected to the read operation undergoes the erase operation.

In the embodiment image pickup apparatus shown in FIG. 13, the writing light WL is always applied to the transparent electrode Et2 of PPC1, the erase operation is performed during each horizontal retrace blanking period as shown in FIG. 15(b), and the read operation is performed during the period other than the blanking period. As described previously, although the writing light WL is always applied to the transparent electrode Et1, the writing operation is not allowed during the horizontal retrace blanking period because the transparent electrodes Et1 and Et2 are made common potential during such a period. The writing operation is performed during the period other than the horizontal retrace blanking period as shown in FIG. 15(b).

Assuming that there are N horizontal scanning periods in a time span from the moment of the erase operation for a certain scanning line of a picture to the moment of the subsequent erase operation for the same scanning line, then the exposure period of the writing light WL to PPC1, during which period electric charge for each of the scanning lines to be read after has been accumulated, becomes N×(one horizontal retrace blanking period).

Since the writing light is applied to the photo-photo conversion element during the read operation, the exposure amount during the read operation may change. However, the read period is (one horizontal scanning period minus horizontal retrace linking period), whereas, the exposure time of the writing light is N×(one horizontal scan period−horizontal retrace blanking period), when N is a very large number compared to one scanning line. Therefore, a shading on a picture of video signals obtained by the image pickup apparatus shown in FIG. 13 is limited to the extent that there occurs no problem in practical use. In addition, such shading can be easily compensated.

According to the image pickup apparatus shown in FIG. 13, a picture of video signals with no shading or with a very limited shading can be easily generated. Also, a photo-photo conversion element of high sensitivity can be readily provided. The embodiments can thus effectively solve the aforementioned prior art problems.

What is claimed is:

1. An image pickup apparatus comprising:
   means for forming an electric charge image corresponding to an optical image of an object to be image-picked up in a photo-photo conversion element constructed of two transparent electrodes with at least a photoconductive layer and a photo-modulation layer being interposed therebetween, by applying a light from said object of said photoconductive layer;
   means for reading said electric charge image corresponding to the optical image of said object as optical information, by applying a reading light to said photo-modulation layer;
   means for erasing said electric charge image corresponding to the optical image of said object, wherein an erase operation and read operation are intermittently repeated for said electric charge image; and
   said reading means operating in a limited period which is substantially short compared to a period in which said forming means operate.

2. An image pickup apparatus comprising:
   means for forming an electric charge image corresponding to the optical image of an object to be image-picked up in a photo-photo conversion element constructed of two transparent electrodes with at least a photoconductive layer and a photo-modulation layer being interposed therebetween, by applying a light from said object to said photoconductive layer;
   means for reading said electric charge image corresponding to the optical image of said object as optical information, by applying a reading light to said photo-modulation layer;
   means for erasing said electric charge image corresponding to the optical image of said object, wherein an erase operation and read operation are alternately and intermittently repeated for said electric charge image;
   means for applying the light from said object to said photo-photo conversion element via an optical shutter; and
   said reading means operating only in a period in which said light incident to said photo-photo conversion element is intercepted by said optical shutter.

3. An image pickup apparatus comprising:
   means for forming in a writing period an electrical charge image corresponding to an optical image of an object to be image-picked up a first photo-photo conversion element;
   means for transferring said electrical charge image formed in said first photo-photo conversion element to a second photo-photo conversion element during a period substantially shorter than said writing period by simultaneously reading and writing said electrical charge image, from said first to second photo-photo conversion elements respectively; and
   means for reading optical image information of an optical image supplied to said second photo-photo conversion element by applying a reading light to the reading light input side of said second photo-photo conversion element.

4. An image pickup apparatus using a photo-photo conversion element comprising:

means for controlling the operation of said image pickup apparatus so as to be executed within every horizontal scanning period, said operation including a write operation by write means for writing optical information of an object to be image-picked up into said photo-photo conversion element as an electric charge image, a read operation in a read period by read means for reading said electric charge image written in said photo-photo conversion element, and an erase operation in an erase period by erase means for erasing said electric charge image subsequent to said read operation therefor, said read period being preceded by said erase period; and means for outputting a time sequential signal by scanning two dimensionally said electric charge image with a reading light.

5. An image pickup apparatus according to claim 4, wherein said erase operation is performed within a horizontal retrace blanking period of a video signal as said time sequential signal.

6. An image pickup apparatus according to claim 4, wherein said write operation is performed within a horizontal retrace blanking period of a video signal, as said time sequential signal.

7. An image pickup apparatus according to claim 5 or 6, wherein said erase means projecting at a time an erasing light in a form of line corresponding to one horizontal line of said electric charge image read by said read means in said read period.

8. An image pickup apparatus according to claim 4, further comprising optical shutter means for interrupting application of the optical image of said object to said photo-photo conversion element during the reading period.

* * * * *